(12) United States Patent
Bailey et al.

(10) Patent No.: US 9,342,124 B2
(45) Date of Patent: May 17, 2016

(54) PROGRAMMABLE AND SIMULTANEOUS LOAD SWITCH CONTROL FOR POWER SEQUENCING

(71) Applicant: TEXAS INSTRUMENTS INCORPORATED, Dallas, TX (US)

(72) Inventors: David Thomas Bailey, Dallas, TX (US); Philomena Cleopha Brady, Corinth, TX (US); Nakshatra Shankar Gajbhiye, Richardson, TX (US); Eric Warren Southard, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 13/966,190

(22) Filed: Aug. 13, 2013

(65) Prior Publication Data

US 2014/0354079 A1 Dec. 4, 2014

Related U.S. Application Data

(60) Provisional application No. 61/828,748, filed on May 30, 2013.

(51) Int. Cl.
*H01H 35/00* (2006.01)
*H01H 83/00* (2006.01)
*G06F 1/26* (2006.01)

(52) U.S. Cl.
CPC ............. *G06F 1/26* (2013.01); *Y02B 70/3225* (2013.01); *Y04S 20/222* (2013.01); *Y10T 307/766* (2015.04)

(58) Field of Classification Search
CPC ................ G06F 1/26; H02J 1/00; H02J 3/14; Y10T 307/766; Y10T 307/944
USPC ...................................... 307/31, 40, 116, 140
See application file for complete search history.

(56) References Cited

U.S. PATENT DOCUMENTS

2008/0238655 A1* 10/2008 McShane ................. G06F 1/32
340/538

* cited by examiner

*Primary Examiner* — Carlos Amaya
(74) *Attorney, Agent, or Firm* — Lawrence J. Bassuk; Frank D. Cimino

(57) ABSTRACT

A power delivery and control device that includes a voltage input line, a voltage output line, a control logic unit coupled to the voltage input and voltage output line to control a voltage being delivered by the voltage output line based on a programmable behavior parameter, a voltage output register accessible to the control logic unit to define the programmable behavior parameter, a control register accessible to the control logic unit to activate and deactivate the voltage output line, and a control line coupled to the control logic unit to receive commands to change content of the voltage output register.

21 Claims, 3 Drawing Sheets

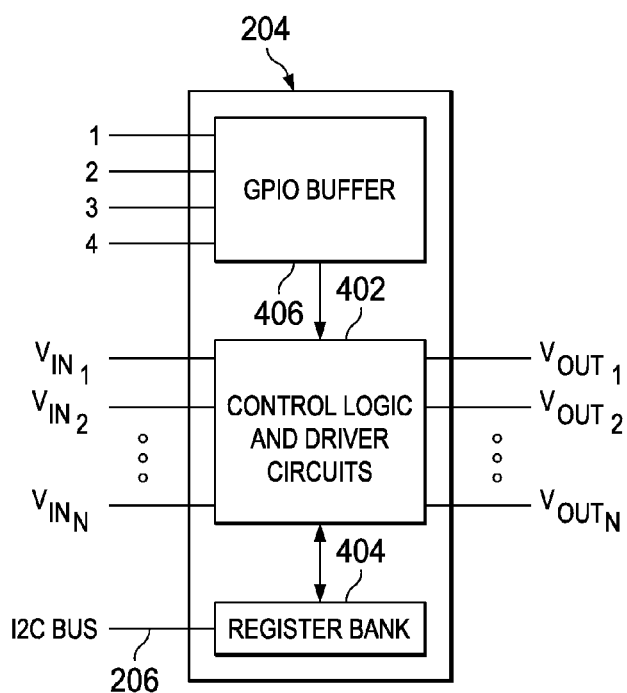
FIG. 4
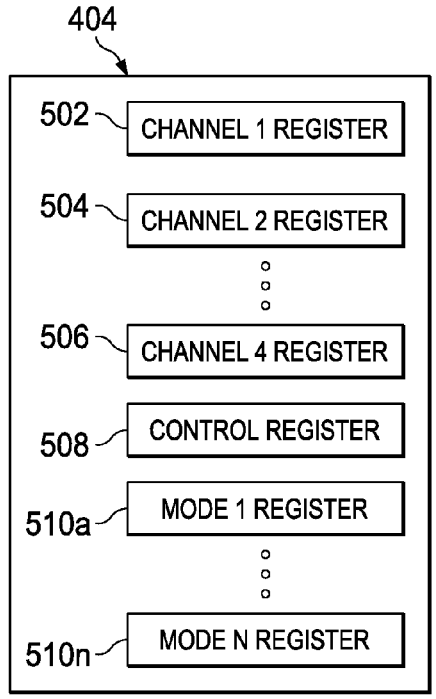
FIG. 5
| BIT | B7 | B6 B5 | B4 B3 B2 | B1 B0 |
|---|---|---|---|---|
| DESCRIPTION | X | ON DELAY | SLEW RATE | OUTPUT DELAY RATE |
FIG. 6
| BIT | B7 B6 B5 B4 | B3 B2 B1 B0 |
|---|---|---|
| DESCRIPTION | I2C/GPIO MODES | CHANNEL ENABLE BITS |
FIG. 7
| BIT | B7 B6 B5 B4 | B3 B2 B1 B0 |
|---|---|---|
| DESCRIPTION | NOT USED | CHANNEL ENABLE BITS |
FIG. 8

US 9,342,124 B2

PROGRAMMABLE AND SIMULTANEOUS LOAD SWITCH CONTROL FOR POWER SEQUENCING

CROSS-REFERENCE TO RELATED APPLICATION

The present application claims priority to U.S. Provisional Patent Application No. 61/828,748, filed on May 30, 2013; which is hereby incorporated herein by reference.

BACKGROUND

Power delivery architectures in modern electronics have become increasingly complex due to demanding power distribution and sequencing requirements. Some electronics (laptop computers, tablet computers, mobile wireless devices, etc.) may require numerous power rails delivering various power levels and the sequence of their initialization at system start up or in various system events may be critical to system operation. Some system components may require a specific controlled slew rate when they initially receive their power and a specific discharge rate when power is removed. Conventional power electronics addresses these requirements using a control line for each power rail and the behavior (on-delay, slew rate, quick output discharge, etc.) of the delivered power may be set at system design using external components. Thus, modern power delivery systems tend to use a lot of printed circuit board (PCB) space and allow for little flexibility due to set power behavior characteristics.

SUMMARY

The problems noted above are solved in large part by a power delivery and control device that includes a voltage input line, a voltage output line, a control logic unit coupled to the voltage input and voltage output line to control a voltage being delivered by the voltage output line based on a programmable behavior parameter, a voltage output register accessible to the control logic unit to define the programmable behavior parameter, a control register accessible to the control logic unit to activate and deactivate the voltage output line, and a control line coupled to the control logic unit to receive commands to change content of the voltage output register.

Another solution may be a power delivery device that includes a plurality of programmable power delivery components connected via a bus, wherein each of the plurality of components is configured to be individually addressable and all of the plurality of components are configured to simultaneously respond to a single, unique command. Each of the plurality of components include an input voltage line, an output voltage line, a channel register coupled to and corresponding to a single input and output voltage line to configure a behavior of a voltage delivered by the corresponding output voltage line, a control register coupled to the output voltage to switch on and off the output voltage line, and a plurality of mode registers coupled to the control register, wherein each of the plurality of mode registers is configured to contain a predetermined mode for the output voltage line.

Yet another solution may be a power control and delivery method that includes receiving, by a plurality of addressable, power delivery components connected by a serial bus, an address for a channel register of at least one of the plurality of addressable, power delivery components, receiving, by a plurality of addressable, power delivery components connected by a serial bus, data to configure a behavior of power delivery of a voltage line associated with the channel register, writing, by a control logic unit of the at least one of the plurality of addressable, power delivery components, the received data to the channel register, wherein the data to configure the behavior of the power delivery of the voltage line configures a slew rate of the voltage line.

BRIEF DESCRIPTION OF THE DRAWINGS

For a detailed description of exemplary embodiments of the invention, reference will now be made to the accompanying drawings in which:

FIG. 4 is a block diagram of an example load switch array implementing the programmable load switch array control as discussed herein;

FIG. 5 is an example block diagram of the channel bank in accordance with the programmable load switch array control as discussed herein;

FIG. 6 is an example channel register implementing the programmable load switch array control as discussed herein;

FIG. 7 is an example control register implementing the programmable load switch array control as discussed herein;

FIG. 8 is an example mode register implementing the programmable load switch array control as discussed herein;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the terms "power channel" and "channel" refer to a power rail or power delivery line that supplies a set power to a specific chip or area of a PCB. "Power channel," "channel," and power rail may be interchangeable.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Historically, power delivery was accomplished using discrete devices (e.g., a few FETs or BJT transistors, resistors, and capacitors) to build a power switch, which eventually led to more integrated devices called load switches. The integrated load switches may have a fixed slew rate and discharge resistance or they may require external discrete components to set their turn on and turn off behavior. In either case, each switch required its own unique connection to control the delivery of power. As such, if a piece of electronics, a laptop for example, required 20 different power rails, it would also require 20 different connections and PCB traces to control those power rails. Further, their behavior (on-delay time, slew rate, discharge rate) were basically fixed upon fabrication due to the discrete parts used to define those behaviors resulting in minimal to no flexibility to adjust power delivery behavior.

Figure 1:
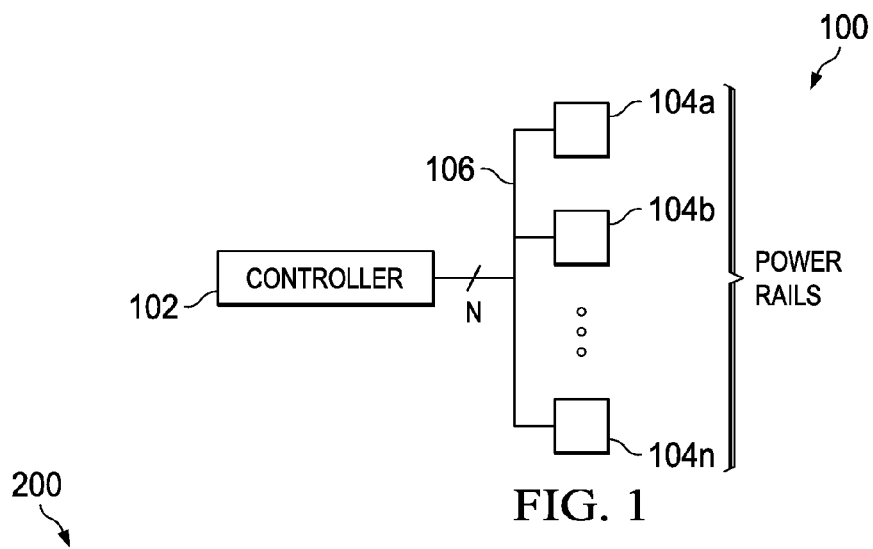
FIG. 1 shows a conventional power delivery system.

FIG. 1 shows a conventional power delivery system 100. The system 100 includes a controller 102, N power rails 104a through 104n, and N power control lines 106. Each of the N power rails 104a-n may be a discrete load switch or an integrated load switch. In either implementation, each of the N power rails 104a-n would require its own power control line, likely a general purpose input/output (GPIO) line, to control the power rail. Thus, the system 100 would require N GPIO lines 106 to switch on and off each of the N power rails 104a-n. Accordingly, an electronic device requiring a large number of power rails, 28 for example, would require 28 individual GPIO lines and the design and layout of those lines on a PCB board. This number of lines not only increases layout complexity due to potential cross-talk, but also more PCB board space. An increase in required PCB space, however, goes against the grain of shrinking electronics.

In addition to the increase in the number of GPIO lines and the PCB space requirements, the N power rails 104a-n, which may be supplying various other integrated circuits (ICs) on the PCB board, would likely deliver different voltages configured with different behavior characteristics. The behavior characteristics may include slew rate, an on-delay (e.g. a time from switching it on to the presence of the power/voltage on the power rail line), and a quick output discharge (QOD) or the time it takes the power on the channel line to decay to zero after having been switched off.

The desired behavior for each of the N power rails 104a-n, conventionally, would be set at design and manufacturing. The behavior would be set due to the use of external components (e.g., resistors and capacitors) used to condition the power delivery to conform to the desired behavior. Thus, configuring the behavior in such a fashion prohibits later adjustments that may be desired due to the hardware nature of the configuration.

Currently, however, the ever shrinking electronics paradigm is driving for smaller devices with fewer to no external components and restricted layout requirements. These newer devices, thus, need power delivery modules that can be controlled using fewer control lines while providing flexibility to adjust power delivery behavior. One method to meet such requirements may be to use a number of load switch array (LSA) integrated circuits (ICs) to deliver power out of various numbers of channels per LSA IC. The LSA ICs may be controlled by a single control processor, such as an embedded controller, with each power array IC being individually addressable power. Further, each channel's behavior of each LSA IC may be adjusted through software commands.

Figure 2:
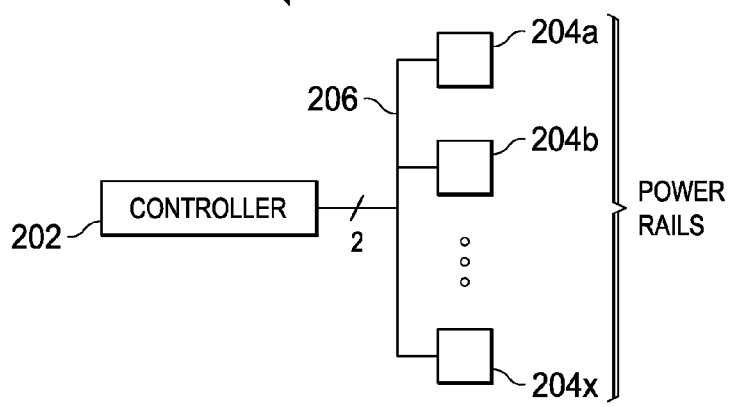
FIG. 2 is a block diagram of a system implementing a programmable load switch array control as discussed herein.

FIG. 2 is a block diagram of a system 200 implementing a programmable load switch array control as discussed herein. The system 200 may comprise a controller 202, a number of LSAs 204a through 204x, and two control lines 206. The system 200 may implement a serial addressing technique, such as inter-integrated circuit (I2C), so that the controller 202 can communicate with each of the LSAs 204a-x. Other serial addressing or network bus addressing techniques may also be implemented such as serial peripheral interface (SPI) bus, two wire interface (TWI), system management bus (SMBus), power management bus (PMBus) or RS-232. The controller 202 may be a micro-controller master configured to address the LSAs 204a-x, which will have assigned slave addresses. Additionally, each of the LSAs 204a-x may comprise a varying number of channels (e.g., from one to four) with each channel's register also individually addressable. As such, the more LSAs and channel included in a system similar to system 200 may require longer addresses to ensure each LSA and each channel retains there individual addressability.

The controller 202 may be able to transmit commands over the control lines 206 to switch on and off each of the LSAs 204a-x individually. Alternatively or additionally, the controller 202 may transmit a single command that causes all of the LSAs 204a-x to respond simultaneously, as will be discussed in further detail below. This single all respond command may be used to load a set operational mode into each of the LSAs and their channels. For example, if the system 200 is implemented in a lap top computer and the user closes the lap top, the controller 202 may send out an all call command causing all LSAs to switch off. Other modes may also be implemented within the scope of this disclosure.

The addressing technique may be used by the controller 202 to deliver commands (data) as well as address individual ICs and channels. Moreover, the addressing technique may also allow for the power controller to address and control multiple of the ICs and multiple channels simultaneously with a single address and command. This single address/command functionality may allow a system to turn on/off all power delivery channels, or multiple combinations of on/off channel conditions spanning multiple ICs and power channels, almost instantly by transmitting a few bytes of data in response to a single event or predetermined power mode. For example, closing a laptop computer may cause all power to be turned off at once.

Figure 3:
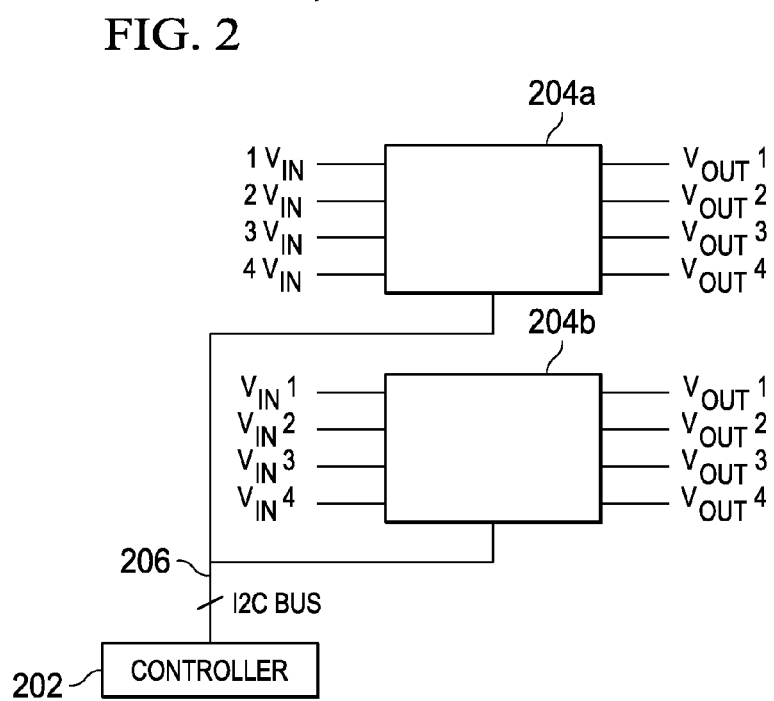
FIG. 3 is another example of the system implementing the programmable load switch array control as discussed herein.

FIG. 3 is another example of the system 200 implementing the programmable load switch array control as discussed herein. This example of system 200 only shows two LSAs, 204a, b, for brevity but may be expanded to include any number of LSAs as long as they are addressable by the serial addressing technique employed by the controller 202. This example of the system 200 comprises the controller 202, the I2C bus 206, and the two LSAs 204a, b, with each of the two LSAs comprising four channels—$V_{OUT}1$ through $V_{OUT}4$. As noted above, each LSA included in a system 200 is individually addressable. Additionally, each of the LSAs' channels may also be individually addressable. Thus, the controller 202 may be able to switch on channel 1 of the LSA 204a, for example, without affecting the operational state the other channels of the LSA 204a are in.

In addition to switching on and off individual channels of the LSAs, the controller 202 may also be able to alter the behavior of the individual channels as well. Each channel's behavior may be programmable. The controller 202 may be able to affect the on-delay, slew rate, and QOD of a channel by addressing a register associated with a channel then writing a new command into that register. Certain bits or combinations of bits of the register may affect one of the behavior characteristics listed above. Thus, the system 200 may implement a programmable and simultaneous load switch control for power sequencing through the use of an addressing technique that allows for the simultaneous control over all LSAs and the programming of an individual channel's power delivery behavior.

Disclosed herein is a device and method that allows for software adjustment of the behavior of power delivery channels along with an addressing technique that provides for addressability of individual channels of an LSA IC, of an individual LSA, or of the complete set of LSA ICs simultaneously. Upon the transmission of an "all call" type command, all of the LSA ICs may simultaneously respond by a predetermined mode into a control register included in each of the LSAs. The control register may then switch on or off each of the channels as dictated by the mode.

FIG. 4 is a block diagram of an example load switch array 204 implementing the programmable load switch array control as discussed herein. The LSA 204 may comprise control logic and driver circuits unit 402, and a register bank 404. The LSA 204 may be coupled to a controller, such as controller 202 in FIGS. 2 and 3. The control logic and driver circuits unit 402 and the register bank 404 are depicted as two separate units but they two units may be combined into a single unit and remain within the scope of this disclosure. Further, the I2C bus 206 is depicted as directly coupled to the register bank 404 but could alternatively be coupled to the unit 402 or a separate communications control unit (not shown). As depicted, the register bank 404 may include the hardware to receive and route addresses and commands received via the I2C bus.

The control logic and driver circuits unit 402 may comprise the configurable logic and power behavior forming components to deliver power on the N channels of the LSA 204. The channel register bits inform the control logic and driver circuits unit 402 what each channel's on-delay, slew rate, and fall time (QOD) should be. Based on the bits of data that dictate the behavior characteristics, the unit 402 may vary a current level that may be used to drive the gates of FETs. The current level may affect the time it takes to build up the charge on the FET to turn it on, which in turn may affect the slew rate, on-delay and QOD. For example, a low current driving a FET that affects the slew rate may result in a long slew rate and vice versa for a high current.

The register bank 404 may comprise a bank of a number of registers to control various aspects of the power delivered by the N channels. Each channel may have an associated register used to set and adjust the channel behavior. Further, the LSA 204 register bank may also comprise a register to switch the N channels on and off in response to commands received over the bus 206. The control register may also be used to control other modes of the LSA 204. Additionally, the register bank 404 may include a number of mode registers used to contain predetermined or preset modes. A mode may dictate an operational state of each of the N channels. The contents of one of the mode registers may be loaded into the control register in response to an all call command received from the controller 202.

Each of the registers in the register bank 404 may have an associated unique address and may be addressable by the controller 202. Since each LSA 204 in a system similar to the system 200 may have a unique address, the registers within an LSA 204 may all have the same internal addresses but are addressable by the controller 202 by first addressing a specific LSA 204, then addressing a register within that LSA 204. Alternatively, a system that has multiple LSA 204 connected to the I2C bus 206 may give each channel and control register a unique address but allow the mode registers of each LSA 204 to have the same address. The distribution and assignment of addresses may be a function of the serial addressing technique employed, are not limited by the present disclosure, and various techniques fall within the scope of this disclosure.

For example, referring to the system 200 of FIG. 3, the two LSAs 204a, and b may have unique addresses but the registers of the respective LSAs may have the same addresses assigned. In this implementation, if the controller was to reconfigure the behavior of the second channel of the LSA 204b, the controller 202 would transmit an address containing the address of the LSA 204b and the address of the second channel. The address command may then be followed by the data to be written into the second channel's channel register. Alternatively, each of the eight channels of the two LSAs 204a, b may have unique address. As such, the controller 202 may just transmit the address of the channel register to reconfigure followed by the data to write into that channel register. Both techniques fall within the scope of the present disclosure.

The mode registers included with each LSA 204, however, may all have the same addresses. For example, the mode 1 register may have an address of 06 in hexadecimal form. Each LSA 204's mode 1 register may then be associated with the same 06h address. The all call command discussed may be one of the mode registers, mode register 12 for example. The all call command, when transmitted, may be followed by an index amount or an address of one of the other mode registers. Then, when an LSA 204 receives the all call command, the LSA 204 may then load the contents of the register designated by the address/index following the all call command into the control register. As such, in a system that comprises multiple LSA 204s, the all call command allows the controller 202 to send out a single command (all call plus the desired mode register to implement) to cause all LSA 204s to act simultaneously.

At a system start up, all of the registers of the LSA 204 may be loaded with a predetermined start up behavior and mode. For example, in an electronic component implementing the system 200 of FIG. 3, at startup the controller 202 may, starting with the channel register of channel 1, write a command then cycle through the rest of the channel registers, the control register, then the mode registers. The sequence may then be repeated with the LSA 204b. Then, once the all of the registers are loaded, the power channels switched on may begin delivering power according to the behavior configured by their associated channel register.

The LSA 204 is also shown in FIG. 4 to comprise a GPIO buffer 406 and N GPIO lines. This may be an alternative implementation of the LSA 204 that allows both GPIO and I2C control. In this embodiment, the control register may use certain bits to switch between I2C and GPIO mode. The inclusion of the GPIO mode may allow for all channels to be switched on at once during a cold boot of a lap top, for example, implementing the programmable load switch array control as discussed herein.

FIG. 5 is an example block diagram of the channel bank 404 in accordance with the programmable load switch array control as discussed herein. The register bank 404 may comprise channel registers 502-506, a control register 508, and N mode registers 510a-n. The number of channel registers included in an LSA 204's register bank may depend on the number of channels, which may vary. The register bank 404 shows four channel registers implying this register bank would be part of a quad-channel LSA 204. A single control register 508 may be used to switch the various channels on and off and to modify the interface mode of the LSA 204, if multiple interface modes are included. Lastly, the number of mode registers 510 may depend on the number of predefined modes an LSA 204 is designed to include. One of the mode registers 510, although, would be set aside for the all call command discussed above.

FIGS. 6, 7, and 8 show example channel, control and mode registers 502, 508, and 510, respectively implementing the programmable load switch array control as discussed herein. Each of the registers may be eight bits in length, but may be other lengths depending on the number of channels and variations in the behavior characteristics being controlled. The channel register 502 may combined the two lowest bits, B0 and B1, to configure the QOD or output decay rate. For example, a "00" may configure the QOD to use a 100 ohm resistor to set the decay rate of the voltage once the power has been turned off. A "01" may correspond to 500 ohms. The different combinations of 0's and 1's may be used to correspond to other resistance values, which would result in a decay rate.

Bits 2 through 4 of the channel register 502 may be used to configure the slew rate. Again, by using the various combinations of 1's and 0's, the slew rate may be changed. For example, loading B4, B3, and B2 with "010" may correspond to a slew rate of 350 μsec/volt. The on-delay may be similarly configured using the bits B5 and B6. For example, a "10" may correspond to an on-delay of 100 μsec. Bit 8 is not used in the example given, but may be used to configure another characteristic or used in conjunction with the three shown to increase the potential variations.

The control register 508 of FIG. 6 is an example of a quad-channel LSA 204 in which the lowest four bits may be used to switch on and off a different channel. For example, loading a "1" into B1 may cause channel 1 to switch on. The higher four bits of the control register may be used to change control of the LSA 204's channels between GPIO and I2C. For example, a 1 in B6 may allow channel 3 to be controlled by the GPIO interface while the other three channels remain under control of the I2C interface.

Lastly, the mode register 510 of FIG. 8 may be preloaded with a predetermined mode or a sequence of channels on and off. The lower bits of the mode register 510 may mirror the lower four bits of the control register 508. This way, loading the lower four bits of the mode register 510 with "0101" may correspond to putting channels 1 and 3 in an on-state and channels 2 and 4 in an off state upon loading the control register with the mode register. Additionally, when the all call command is received by the LSA 204, then the contents of the designated mode may be loaded into the control register.

Figure 9:
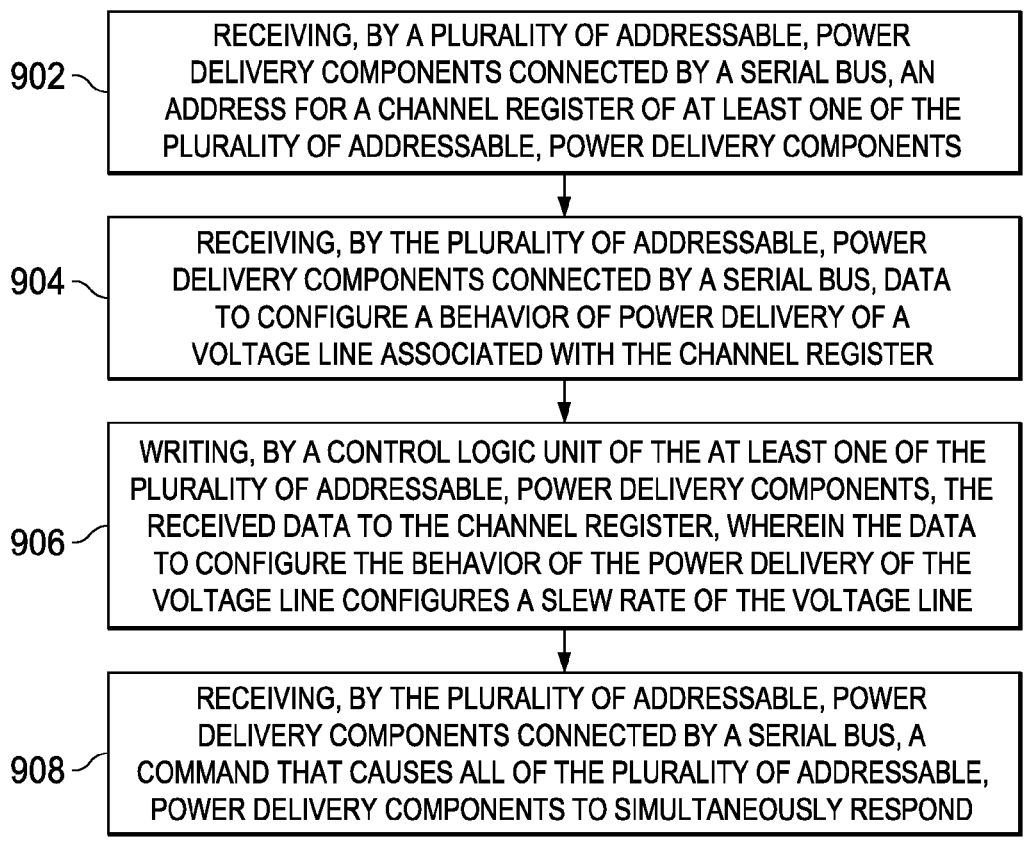
FIG. 9 is a flow diagram of a method implementing the programmable load switch array control as discussed herein.

FIG. 9 is a flow diagram of a method 900 implementing the programmable load switch array control as discussed herein. The method 900 may represent one technique in implementing the programmable and simultaneous load switch control for power sequencing. The method 900 begins at step 902 with a plurality of addressable, power delivery components connected by a serial bus receiving an address for a channel register of at least one of the plurality of addressable, power delivery components. The addressable, power delivery components may be a LSA 204 and the plurality of components may comprise a system 200 as in FIG. 2 or FIG. 3. One of the LSA 204s of a system 200 may receive an address for a channel register from a controller, such as controller 202. Receiving the address of a channel register may inform the receiving LSA 204 that a command for the power channel associated with the channel register is forthcoming.

The method 900 continues at step 904 with the plurality of addressable, power delivery components connected by a serial bus receiving data to configure a behavior of power delivery of a voltage line associated with the channel register. The data received may be loaded into the channel register to adjust or to define a behavior of the associated power channel. The data may adjust a subset of or all of the set of behavior parameters, such as an on-delay time, a slew rate, or a QOD (the output decay rate).

The method 900 may then continue with step 906 with a control logic unit of the at least one of the plurality of addressable, power delivery components writing the received data to the channel register, wherein the data to configure the behavior of the power delivery of the voltage line configures a slew rate of the voltage line. The control logic and driver circuits unit 402 may write or load the received data into the addressed channel register. Loading the addressed channel register with the received data may affect the power being delivered by the associated channel. Thus, the next time that channel is activated, the new configuration defined by the different parameters received may cause the power delivered to be different than before. For example, if the on-delay has been changed from 100 μsec to 500 μsec, then the next time that channel is activated, the power will take an additional 400 μsecs before appearing on the channel.

Additionally, the method 900 may also include step 908 in with the plurality of addressable, power delivery components connected by a serial bus receiving a command that causes all of the plurality of addressable, power delivery components to simultaneously respond. This command may be similar to the all call command discussed above. The all call command may correspond to an address for one of the mode registers included in each of the LSA 204s. The all call command may be followed by an address of one of the other mode registers. This designated mode register may be loaded into the control register 508 by the control logic and driver circuits unit 402 of each of the plurality of LSA 204s. The all call command and designated mode register may be simultaneously implemented by each of the plurality of components.

The addressability of both the LSA 204s and various registers as discussed herein may implement the programmable and simultaneous load switch control for power sequencing as discussed herein. Each of the channel registers included in the load switch arrays may be associated with a power channel and may allow the behavior of the power channel to be programmably altered. The programmable nature of the power channel may add flexibility to the design and implementation of power delivery and sequencing components in all facets of electronics design and fabrication. Additionally, by making each component addressable and using a serial addressing technique, such as I2C, the amount of control lines required to switch power channels/rails on and off may be reduced to as few as one, depending on the serial address technique employed. This may reduce the amount of PCB board space needed for power delivery components and modules. Lastly, the programmable nature of the power delivery may also reduce the amount of external components needed to configure the behavior of each power channel, which may lead to a reduction in discrete, external component counts.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power delivery and control device, comprising:
   a voltage input line;
   a voltage output line;
   a control logic unit coupled to the voltage input and voltage output line to control a voltage being delivered by the voltage output line based on a programmable behavior parameter;

a voltage output register accessible to the control logic unit to define the programmable behavior parameter;

a control register accessible to the control logic unit to activate and deactivate the voltage output line; and a control line coupled to the control logic unit to receive commands to change content of the voltage output register.

2. The device of claim 1, wherein the programmable behavior parameter is configured to cause a turn-on time of the voltage output line to change.

3. The device of claim 1, wherein the programmable behavior parameter is configured to cause a slew rate of the voltage output line to change.

4. The device of claim 1, wherein the programmable behavior parameter is configured to cause an output decay time of the voltage output line to change.

5. The device of claim 1, further comprising a plurality of mode registers to store a plurality of predetermined modes.

6. The device of claim 5, wherein each of the voltage output register, the control register, and the plurality of mode registers are individually addressable.

7. The device of claim 5, wherein the contents of one of the plurality of mode registers is loaded into the control register based on a command received on the control line.

8. A power delivery device, comprising:
a plurality of programmable power delivery components connected via a bus, wherein each of the plurality of components is configured to be individually addressable and all of the plurality of components are configured to simultaneously respond to a single, unique command;
each of the plurality of components comprising:
an input voltage line;
an output voltage line;
a channel register coupled to and corresponding to a single input and output voltage line to configure a behavior of a voltage delivered by the corresponding output voltage line;
a control register coupled to the output voltage to switch on and off the output voltage line; and
a plurality of mode registers coupled to the control register, wherein each of the plurality of mode registers is configured to contain a predetermined mode for the output voltage line.

9. The module of claim 8, wherein the plurality of components are configured to be addressable over the bus using a serial interface addressing technique.

10. The module of claim 8, wherein each of the channel register of the plurality of components are configured to be individually addressable over the bus using a serial interface addressing technique.

11. The module of claim 8, wherein each of the control registers of the plurality of components is configured to be individually addressable over the bus using a serial interface addressing technique.

12. The module of claim 8, wherein each of the plurality of mode registers of the plurality of components is configured to be individually addressable over the bus using a serial interface addressing technique.

13. The module of claim 12, wherein each of the plurality of mode registers of the plurality of components contain identical modes and have identical addresses.

14. The module of claim 12, wherein the single, unique command is an address of one of the plurality of mode registers and is accompanied with a mode register designation.

15. The module of claim 14, wherein the plurality of components, upon receiving the single, unique command and the accompanying mode register designation, loads the control register with the contents of the designated mode register.

16. The module of claim 8, wherein the serial interface addressing technique is an inter-integrated circuit (I2C) bus addressing technique.

17. A power control and delivery method, comprising:
receiving, by a plurality of addressable, power delivery components connected by a serial bus, an address for a channel register of at least one of the plurality of addressable, power delivery components;
receiving, by the plurality of addressable, power delivery components connected by a serial bus, data to configure a behavior of power delivery of a voltage line associated with the channel register;
writing, by a control logic unit of the at least one of the plurality of addressable, power delivery components, the received data to the channel register;
wherein the data to configure the behavior of the power delivery of the voltage line configures a slew rate of the voltage line.

18. The method of claim 17, wherein the data to configure the behavior of the power delivery of the voltage line further configures an on-delay of the voltage line.

19. The method of claim 17, wherein the data to configure the behavior of the power delivery of the voltage line further configures an output voltage delay of the voltage line.

20. The method of claim 17, further comprising:
receiving, by the plurality of addressable, power delivery components connected by a serial bus, a command that causes all of the plurality of addressable, power delivery components to simultaneously respond.

21. The method of claim 20, wherein the command includes an address that causes all of the plurality of addressable, power delivery components to respond and also information directing how each of the plurality of addressable, power delivery components are to respond.

* * * * *